(No Model.)

W. DEVOLLD & W. C. DEVOLL.
ANIMAL TRAP.

No. 384,827. Patented June 19, 1888.

UNITED STATES PATENT OFFICE.

WILLIAM DEVOLLD AND WILLIAM CLARK DEVOLL, OF NEAR ST. MARY'S, KANSAS.

ANIMAL-TRAP.

SPECIFICATION forming part of Letters Patent No. 384,827, dated June 19, 1888.

Application filed October 22, 1887. Serial No. 253,155. (No model.)

*To all whom it may concern:*

Be it known that we, WILLIAM DEVOLLD and WILLIAM CLARK DEVOLL, citizens of the United States, residing near St. Mary's, in the county of Pottawatomie and State of Kansas, have invented certain new and useful Improvements in Rat and Mouse Traps, of which the following is a description.

Our invention relates to an improvement in self-setting traps; and the object of our invention is to provide an animal-trap which, after one animal has been caught, is reset, ready to catch another, by the attempts of the animal which has been caught to escape.

Figure 1:
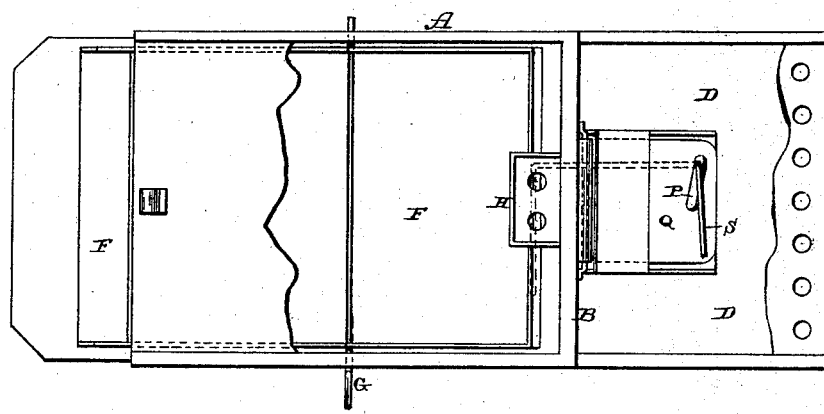
Figure 2:
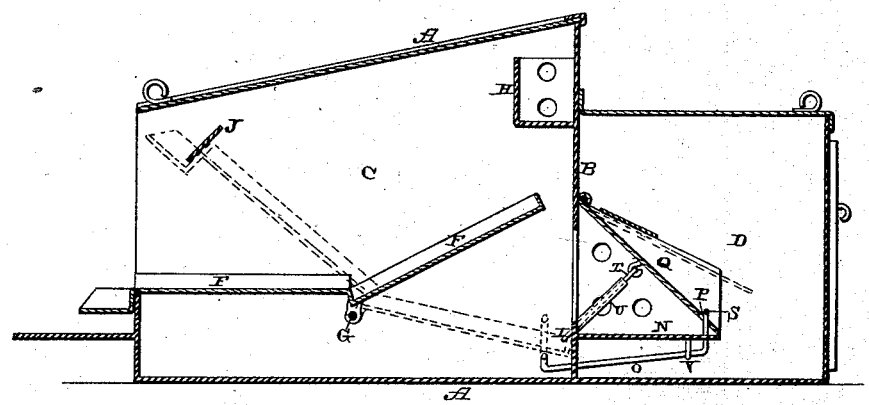

Figure 1 is a plan view, partly in section, which embodies our invention. Fig. 2 is a vertical longitudinal section of the same.

A represents the frame or body of the trap, which is divided by the vertical partition B into two chambers, C D. The outer end of the chamber C is open, so as to allow the animal to freely enter, and in this chamber is pivoted the platform F upon the rod G, which extends entirely across the frame, as shown in Fig. 1. The platform is preferably shaped, as shown, so that after the animal has entered to get the bait in the box H the platform will tilt, from the weight of the animal upon its inner end, into the position shown in dotted lines in Fig. 2, and in which position it is automatically locked by the rod J. While in this tilted position the outer end of the platform rises, so as to strike against the stop J, and thus closes the outer end of the chamber, so that the animal cannot escape at this point. When the animal steps upon the inner end of the platform in its attempt to get the bait, the platform tilts into the position shown in dotted lines, and then when the animal finds that the outer end of the chamber is closed, so that it cannot escape in that direction, it passes through the opening L in the partition B upon the platform N in the chamber D. As the inner end of the platform F sinks, it strikes against the inner end of the lever O, which has its inner end to extend horizontally through the partition B, and which has its other end, S, located in the chamber D, to pass up through the platform N and through the slot P in the slanting cover Q. This rod O serves to start the inner end of the platform in its upward movement, and thus cause it to return to position. The end S of this rod is bent, as shown in Fig. 1, so as to extend horizontally over the top of the cover Q, and thus prevent the cover from being raised without causing the rod to partially turn in its bearing. When an attempt is made to raise the door Q, its upward movement also raises the end S into a vertical position, causing the end located under the inner end of the platform to force this end of the platform upward as soon as the platform is left free to move.

Loosely connected to the under side of the cover Q is the rod T, which passes through the tube U and through the partition B, and which rod T has its lower end to catch over the top edge of the inner end of the platform F, when it is depressed by the weight of the animal, in the position shown in dotted lines in Fig. 2. As the end of the platform sinks downward and strikes against the inner end of the rod O, the rod turns partially in its bearings formed by the partition B and the hanger V, so that the end S will turn down over the top of the cover Q. When the animal passes through the opening L upon the platform N and presses upward against the inclined door Q, the cover rises and the animal steps from the platform into the chamber D, which is provided with suitable doors or slides through which the animals are to be removed. As the door Q is raised by the animal, the rod T is drawn upward, releasing the platform F, which is heaviest at its outer end, and at the same time operates the rod O, so that its inner end braces upward against the inner end of the platform and starts it in its tilting movement. As the inner end of the platform rises and the door Q drops back into position, the rod O is caused to partially turn by the inclined slot P in the door Q, so that the end S drops down into such a position that the door cannot be raised without causing the rod to partially revolve and thus raise both of its ends. By this construction each animal resets the trap for the next one.

Having thus described our invention, we claim—

The combination of the frame A, divided by the partition B into the two chambers C D, with the pivoted platform F, the platform N, the inclined door Q, having the rod T secured to its under side, and the rod O, having its two ends bent at an angle, and which is caused to partially revolve by the movement of the door Q, substantially as shown and described.

WM. DEVOLLD.
WILLIAM CLARK DEVOLL.

Witnesses:
A. J. BEAKEY,
W. J. COSTELL.